United States Patent [19]

Nagase et al.

[11] Patent Number: 5,018,362

[45] Date of Patent: May 28, 1991

[54] APPARATUS FOR CONTROLLING AUTOMOTIVE AIR CONDITIONER

[75] Inventors: Kenichi Nagase, Nagoya; Hiroshi Haraguchi, Kariya; Toshiaki Mizuno, Nagoya; Takayuki Kamada, Kariya, all of Japan

[73] Assignee: Nippondenso Co., Ltd., Kariya, Japan

[21] Appl. No.: 442,554

[22] Filed: Nov. 28, 1989

[30] Foreign Application Priority Data

Nov. 28, 1988 [JP] Japan .................. 63-300375

[51] Int. Cl.$^5$ .................. B60H 1/32; F25B 27/00
[52] U.S. Cl. .................. 62/133; 62/228.5; 62/243; 62/323.1; 123/339
[58] Field of Search .............. 62/133, 243, 244, 323.1, 62/323.4, 228.4, 228.5, 229, 230, 196.1, 196.2; 163/43; 123/339, 340; 364/431.07, 431.1

[56] References Cited

U.S. PATENT DOCUMENTS 4,488,411 12/1984 Hara .................. 62/133

FOREIGN PATENT DOCUMENTS

57-121919 7/1982 Japan .
0048221 3/1984 Japan .................. 62/133
0092212 5/1984 Japan .................. 62/133
61-135953 6/1986 Japan .

Primary Examiner—Harry B. Tanner
Attorney, Agent, or Firm—Cushman, Darby & Cushman

[57] ABSTRACT

An automotive air conditioner controller for controlling the operation of an automotive air conditioner employing a variable displacement compressor capable of gradually or continuously varying its displacement. While the engine of the automobile is idling, the automotive air conditioner controller adjusts the displacement of the compressor to or near to the maximum, varies desired idling speed of the engine according to required cooling ability, and adjusts the actual idling speed of the engine to the desired idling speed. Thus, the engine operates at an improved fuel consumption rate without reducing the cooling ability of the automotive air conditioner.

12 Claims, 6 Drawing Sheets

APPARATUS FOR CONTROLLING AUTOMOTIVE AIR CONDITIONER

BACKGROUND OF THE INVENTION

1. Field of the Invention

The present invention relates to an apparatus for controlling an automotive air conditioner.

2. Description of the Prior Art

Some recent automotive air conditioners employ a variable displacement compressor in which the displacement can be gradually or continuously varied. Such an automotive air conditioner employing a variable displacement compressor has advantages, as compared with those employing a fixed displacement compressor, of being able to stably control the temperature of the passenger room and being able to reduce shocks on the engine of the automobile attributable to the complete turn on and turn off of the compressor.

In an automobile provided with an automotive air conditioner employing a variable displacement compressor, the engine is adjusted to a comparatively high idling speed, which is unnecessarily high when the automotive air conditioner is in the normal operation, to enable the automotive air conditioner to operate at maximum cooling capacity even during idling of the engine so that the displacement of the variable displacement compressor can be varied to adjust the temperature of the passenger room. Accordingly, the rate of fuel consumption of the automobile during idling is high.

SUMMARY OF THE INVENTION

It is an object of the present invention to provide an apparatus for controlling automotive air conditioner capable of improving the rate of fuel consumption during idling of an automobile equipped with an automotive air conditioner employing a variable displacement compressor.

It is another object of the present invention to effectively improve the rate of fuel consumption during idling of an automobile equipped with an automotive air conditioner employing a variable displacement compressor without reducing the cooling ability of the automotive air conditioner through feedback control of the rotating speed of the engine driving the variable displacement compressor according to desired cooling ability while the automotive air conditioner is operating with the variable displacement compressor operating at or near the maximum displacement.

It is a further object of the present invention to provide an automotive air conditioner controller for adjusting the displacement of the variable displacement compressor of an automotive air conditioner to or near to the maximum displacement upon the actuation of the automotive air conditioner during the idling operation of the engine of the automobile, setting a desired engine speed according to a required cooling ability with the displacement of the variable displacement compressor adjusted to or near to the maximum displacement, and adjusting the engine speed to the desired engine speed by a feedback control process.

It is still a further object of the present invention to prevent the exhaustion of the storage battery of the automobile attributable to the excessive lowering of the idling speed of the engine by giving priority to charging the storage battery by the AC dynamo instead of lowering a desired engine speed when the storage battery is not sufficiently charged.

It is an even further object of the present invention to prevent the excessive lowering of the idling speed liable to cause the engine to stop due to unstable combustion by restricting the lowering of the idling speed to a predetermined lower limit.

BRIEF DESCRIPTION OF THE DRAWINGS

These and other aspects of the invention will now be described in detail with reference to the accompanying drawings, wherein:

FIG. 2-1 and FIG. 2-2 are flow charts of a control program to be executed by the automotive air conditioner controller of FIG. 1;

DETAILED DESCRIPTION OF THE PREFERRED EMBODIMENT

Figure 6:
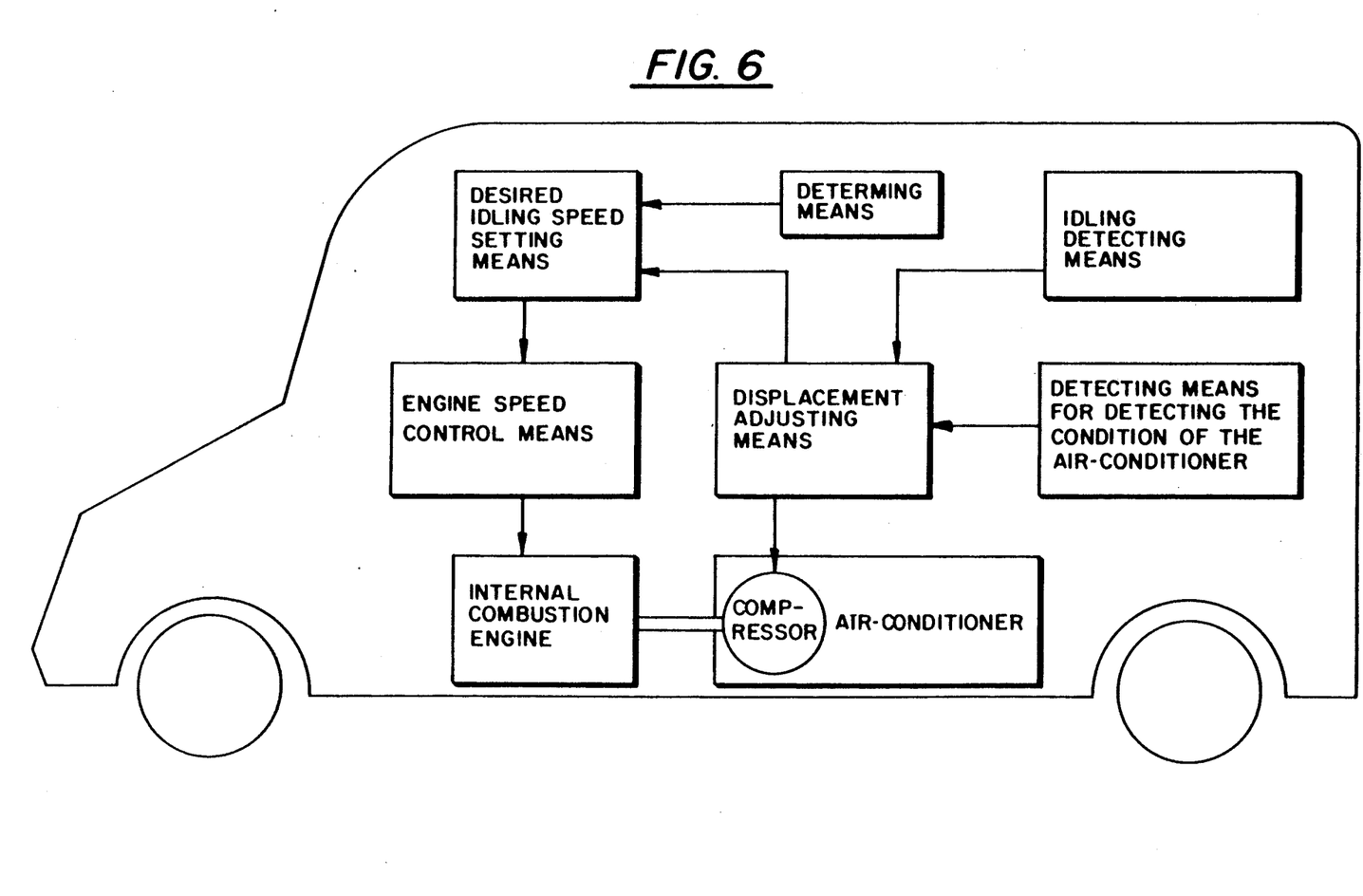
FIG. 6 is a block diagram of an automotive air conditioner controller in a preferred embodiment according to the present invention.

FIG. 6 shows a block diagram of the invention. Internal combustion engine 1 drives an air conditioner 2 having a variable displacement compressor. Idling detecting means 3 detects when the vehicle is idling, and a detecting means 4 detects the air conditioning state. Displacement adjusting means 5 maximizes the compressor displacement when the idling state is detected and the air conditioner is operating. Determining means 6 determines if the cooling ability of the air conditioner needs to increase. If so, the desired idling speed setting means, checks the displacement of the compressor to see if it is maximum, and if so, increases the desired idling speed.

An engine speed control means 8 keeps the idling speed at the desired idling speed.

Figure 1:
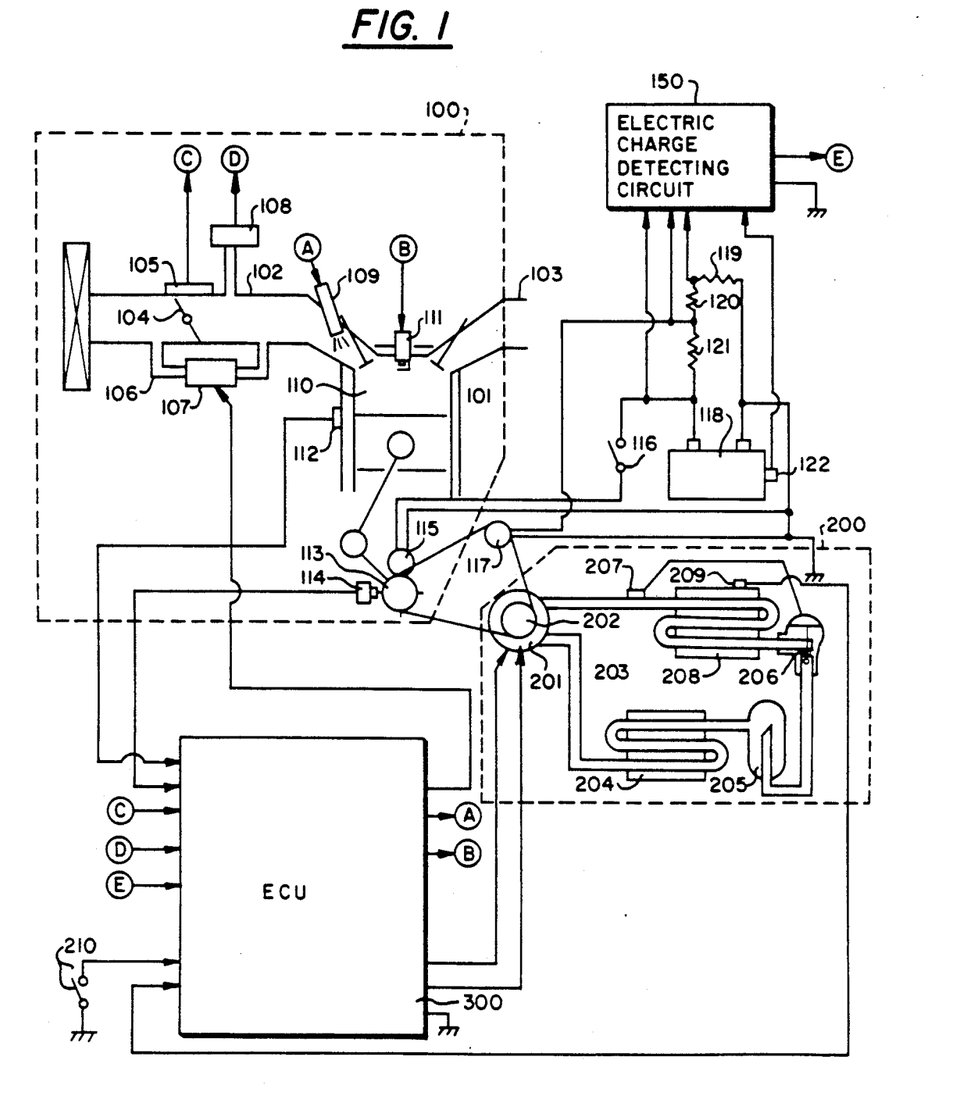
FIG. 1 is a diagrammatic illustration showing a portion of an automobile equipped with an automotive air conditioner controlled by an automotive air conditioner controller embodying the present invention.

Referring to FIG. 1, a spark ignition multicylinder internal combustion engine (hereinafter referred to simply as "engine") 100 has an engine unit 101, an intake pipe 102 joined to an intake manifold connected to the engine unit 101 and an exhaust pipe 103 joined to an exhaust manifold connected to the engine unit 101.

A throttle valve 104 provided on the intake pipe 102 is operated by the driver to regulate the suction rate of the engine 100. The throttle valve 104 is provided with an idle detector 105 for detecting the fully closed position of the throttle valve 104. A bypass valve 107 of a linear solenoid actuator type is provided in a bypass passage 106 bypassing the throttle valve 104 to regulate the idling speed of the engine 100 when the throttle valve 104 is fully closed for idling through the regulation of the sectional area of the bypass passage 106, namely through the regulation of the flow rate of air flowing through the bypass passage 106. A pressure sensor 108 for detecting the pressure within the intake pipe 102 is provided after the throttle valve 104 with respect to the direction of flow of air on the intake pipe 102. Fuel injection valves 109 are provided on the intake manifold respectively for the cylinders.

Ignition plugs 111 are provided on the engine unit 101 to ignite an air-fuel mixture sucked into combustion chambers 110. Also provided on the engine unit 101 is a temperature sensor 112 for detecting the temperature of the cooling water for cooling the engine unit 101. A crank angle detector 114 is associated with the crankshaft 113 of the engine unit 101 to detect the crank angle of the crankshaft 113. A starting motor 115 drives the engine 100 only while a starter switch 116 is closed in starting the engine 100. A storage battery 118 is charged by an AC dynamo 117 driven by the engine.

Connected to the storage battery 118 are at least one electrical load, including the head lamps of the automobile, a current detecting resistor 120 for detecting a current supplied to the electrical loads, and a shunt resistor 121. The storage battery 118 is provided with a temperature sensor 122 for detecting the temperature of the electrolyte of the storage battery 118. Signals representing a voltage at a junction point common to the electrical load 119 and the current detecting resistor 120, a voltage at a junction point common to the current detecting resistor 120, the shunt resistor 121 and the AC dynamo 117, and a voltage at a junction point common to the starting motor 115 and the battery 118 are applied to the input terminals of an electrical charge detecting circuit 150, such as disclosed in J.P. Provisional Pub. (Kokai) No. 53-127646, for detecting the electric charge stored in the storage battery 118. The output signal of the temperature sensor 122 is applied to the electric charge detecting circuit 150.

The electric charge detecting circuit 150 detects an initial electric charge stored in the storage battery 118 immediately before starting the engine 100 on the basis of the relation between a current supplied to the starting motor 115 for cranking and the terminal voltage of the storage battery 118 represented by the input signals. The electric charge detecting circuit 150 detects the electric charge stored in the storage battery 118 during the operation of the engine 100 by adding an electric charge charged to and subtracting an electric charge discharged from the initial electric charge during the operation of the engine 100.

An air conditioner 200 for cooling and dehumidifying the air in the passenger room employs a variable displacement compressor (hereinafter referred to simply as "compressor") 201 capable of continuously varying the displacement thereof. The crankshaft 113 of the engine 100 is connected to the compressor 201 by an electromagnetic clutch 202 to drive the compressor 201. The compressor 201 compresses a gaseous refrigerant. The refrigerant compressed by the compressor 201 is supplied through a line 203 to a condenser 204, which discharges the heat of the compressed refrigerant to reduce the refrigerant from its vapor phase to its liquid phase. The liquid refrigerant is stored temporarily in a receiver 205 connected to the condenser 204. Connected to the receiver 205 is an expansion valve 206, the opening of which varies according to temperature detected by a temperature sensor 207 provided in a line connected to the outlet port of an evaporator 208. The quantity of the refrigerant that flows through the expansion valve 206 under falling pressure and increasing volume varies according to the opening of the expansion valve 206. The expanded refrigerant vaporizes in the evaporator 208 to cool the air flowing through the evaporator 208 by absorbing the heat of vaporization. The temperature of the cooled air blown into the passenger room is detected by a supply air temperature sensor 209 provided at a blowing opening.

An electronic control unit (hereinafter abbreviated to "ECU") 300 for controlling the engine 100 and the air conditioner 200 receives signals from the idle switch 105, the pressure sensor 108, the temperature sensor 112, the crank angle detector 114, the electric charge detecting circuit 150, the supply air temperature sensor 209 and an air conditioner actuating switch 210 which is closed by the driver to actuate the air conditioner 200, and controls the engine 100 and the air conditioner 200 on the basis of the input signals. The essential part of the ECU 300 is a digital computer comprising a CPU (central processing unit), a RAM (random access memory) and a ROM (read-only memory).

Figure 21:
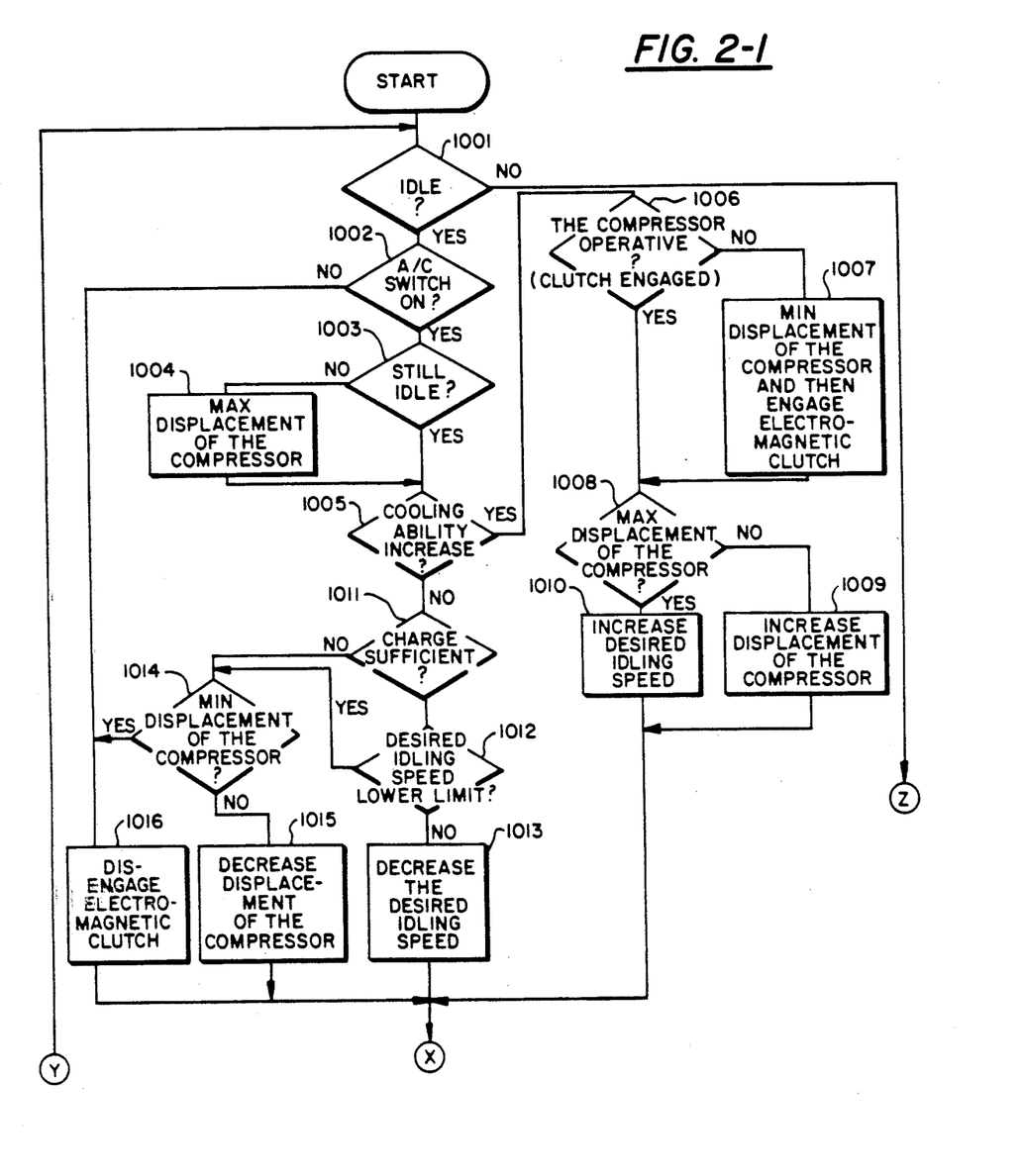
Figure 22:
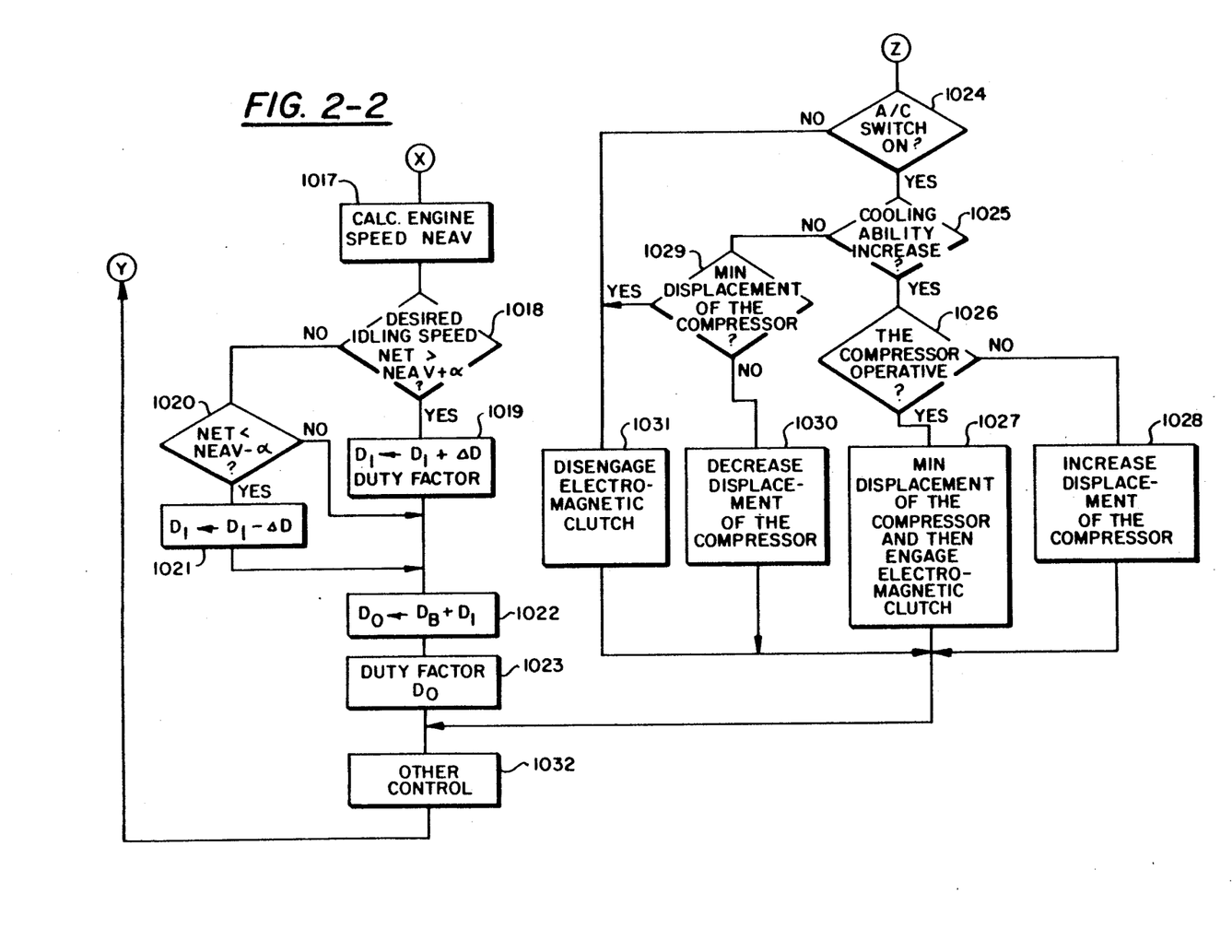

A control program to be executed by the ECU 300 will be described hereinafter with reference to FIG. 2-1 and FIG. 2-2.

FIG. 2-1 and FIG. 2-2 show a flow chart of the control program, which is started upon the completion of the engine starting operation. In step 1001, a decision whether or not the engine 100 is idling is made on the basis of a signal provided by the idle detector 105. When the decision in step 1001 is affirmative, a query is made in step 1002 to see if the air conditioner actuating switch 210 is closed. When the response in step 1002 is affirmative, a query is made in step 1003 to see if the engine 100 is still idling. Step 1005 is executed immediately when the response in step 1003 is affirmative, or when the response is negative, the displacement of the compressor 201 is increased to the maximum in step 1004 followed by step 1005.

In step 1005, a decision whether or not the cooling ability of the air conditioner 200 must be increased is made on the basis of the temperature of the cool air detected by the supply air temperature sensor 209, the room temperature, the intensity of solar radiation and the external temperature detected by sensors, and a set room temperature set by the driver. When the decision in step 1005 is affirmative, a query is made in step 1006 to see if the compressor 201 is connected to the crankshaft 113, namely, is the electromagnetic clutch 202 is engaged. Step 1008 is executed immediately when the response in step 1006 is positive (compressor engaged). If the result at step 1006 is negative, (compressor disengaged), step 1008 is executed after decreasing the displacement of the compressor 201 to the minimum and then connecting the compressor 201 to the crank shaft 113 in step 1007. Step 1008 determines if the displacement of the compressor 201 has been increased to its maximum value. An affirmative result causes step 1010 to be executed immediately, to increase a desired idling speed NET. If the compressor is not at maximum displacement at step 1008, the displacement of the compressor 201 is increased by a predetermined value in step 1009 followed by control passing to point x.

Figure 3:
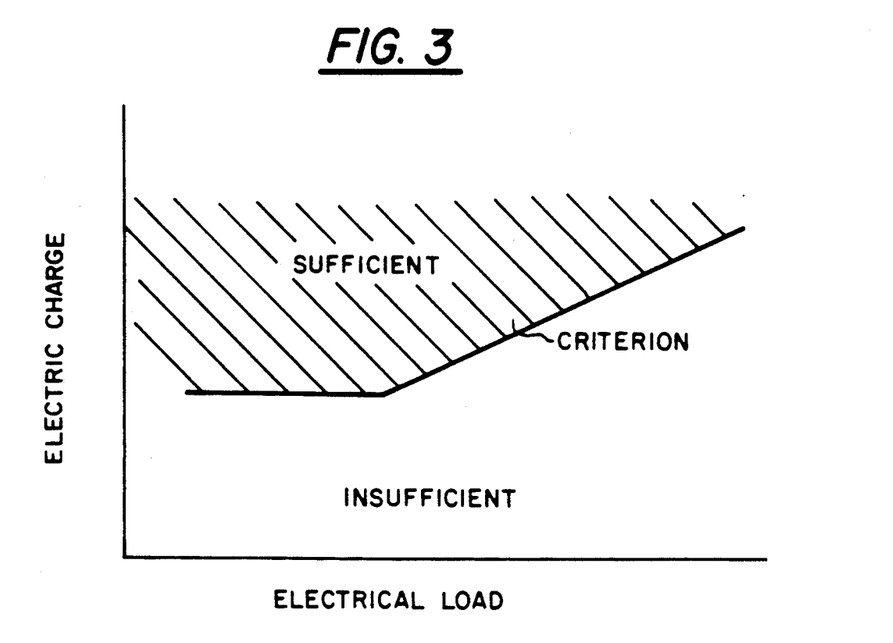
FIG. 3 is a graph showing the variation of the necessary electric charge stored in the storage battery with the electrical load on the storage battery.

When the response in step 1005 is negative, and the cooling ability does not need an increase, step 1011 is executed to determine, on the basis of an output signal provided by the electric charge detecting circuit 150, if the electric charge stored at the moment in the storage battery 118 is less than a set critical electric charge corresponding to an electric power currently consumed by the electrical load 119 as shown in FIG. 3. Step 1012 is executed immediately when the response in step 1011 is affirmative, that is, when a sufficient electric charge is stored in the storage battery 11B. Step 1012 determines if the desired idling speed NET set at the moment is equal to a lower limit idling speed determined for a temperature of the cooling water and the position of the automatic transmission, namely, a neutral range or a drive range, detected by a position detecting switch, not shown. Step 1013 is executed to decrease the desired idling speed NET by a predetermined value when the response in step 1012 is negative.

When the electric charge stored in the storage battery 118 is insufficient for the electrical load at the moment (step 1011 negative) or when the response in step 1012 is affirmative, namely, the desired idling speed NET at the moment coincides with the lower limit idling speed, the control passes to step 1014. In step 1014, a query is made to see if the displacement of the compressor 201 coincides with the minimum. If not, step 1015 is executed to decrease the displacement of the compressor 201 by a predetermined value. Step 1016 is executed to disconnect the compressor 201 from the crankshaft 113 when the response in step 1014 is affirmative.

When the response in step 1002 is negative, namely, when the air conditioner actuating switch 210 is not closed, the program jumps to step 1016 to disconnect the compressor 201 from the crankshaft 113.

Figure 4:
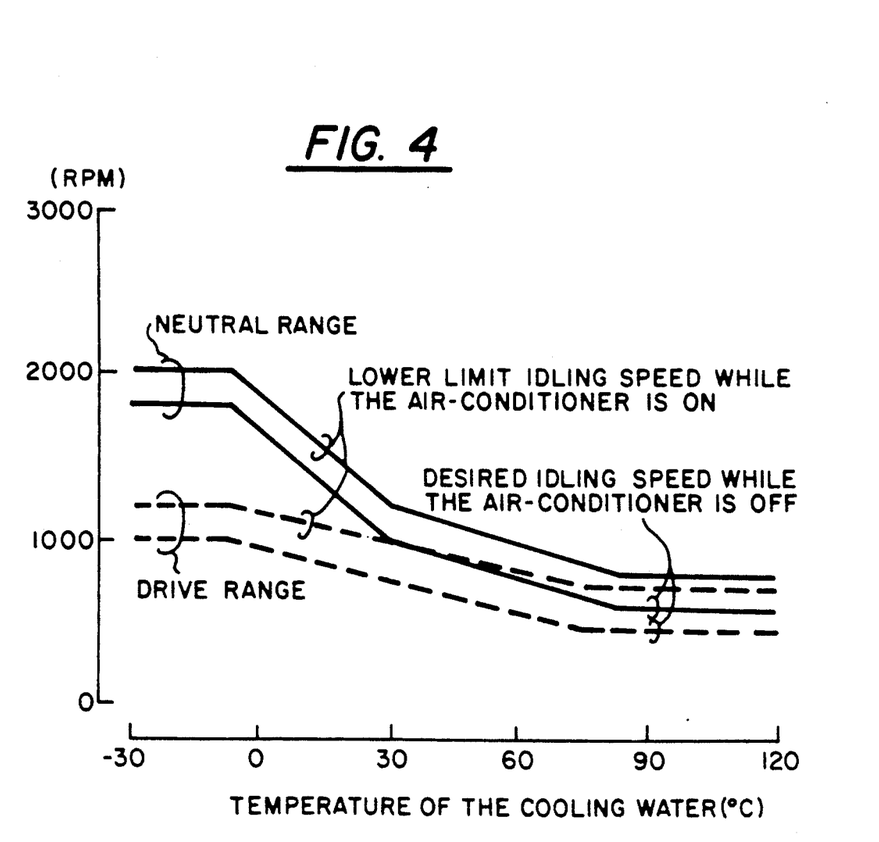
FIG. 4 is a graph showing the variation of desired idling speed and lower limit idling speed with the temperature of cooling water.

After completing any one of steps 1009, 1010, 1013, 1015 and 1017, control passes to point X in FIG. 2-2 where the mean engine speed NEAV over a predetermined period typifying actual engine speeds calculated on the basis of detection signals provided by the crank angle detector 114 within the predetermined period is calculated. Then, in step 1018, the desired idling speed NET is compared with the sum of the mean engine speed NEAV and a constant $\alpha$. As shown in FIG. 4, the desired idling speed NET while the air conditioner actuating switch 210 is open is a function of the temperature of the cooling water for the position of the automatic transmission (the neutral range and the drive range). When NET > NEAV + $\alpha$, namely, when the actual engine speed is lower than the desired idling speed NET, integral duty factor $D_I$ is increased by $\Delta D$ in step 1019. When NET $\leq$ NEAV + $\alpha$, the idling speed NET is compared with the remainder of subtraction of the constant $\alpha$ from the mean engine speed NEAV, in step 1020. When NET < NEAV − $\alpha$, namely, when the actual engine speed is higher than the desired idling speed NET, integral duty factor $D_I$ is decreased by $\Delta D$ in step 1021. Then, in step 1022, basic duty factor $D_B$, the value of which is dependent on the temperature of the cooling water, and integral duty factor are added to obtain output duty factor $D_O$ for the present control cycle. The output duty factor $D_O$ is given to the bypass valve 107 to set the bypass valve 107 at an opening corresponding to the output duty factor $D_O$. The greater the output duty factor $D_O$, the greater the opening of the bypass valve 107.

When the response in step 1001 is negative, the program jumps to point Z in FIG. 2-2 which begins at step 1024 to see, similarly to the query in step 1002, if the air conditioner actuating switch 210 is closed. When the response in step 1024 is affirmative, a query is made in step 1025 as in step 1005 to see if the cooling ability of the air conditioner must be increased. When the response in step 1025 is affirmative, a query is made to see, similarly to the operation in step 1006, if the compressor 201 is disconnected from the crankshaft 113. When the response in step 1026 is affirmative, the displacement of the compressor 201 is increased by a predetermined value in step 1028. When the response in step 1026 is negative, a control operation similar to that in step 1007 is executed in step 1027 to connect the compressor 201 to the crankshaft 113 after decreasing the displacement of the compressor 201 to the minimum. When the response in step 1025 is negative, the program goes to step 1029 to see, similarly to the query in step 1014, if the displacement of the compressor 201 is decreased to the minimum. When the response in step 1029 is negative, the displacement of the compressor 201 is decreased, as in step 1015, by a predetermined value in step 1030. When the response in step 1029 is affirmative, the compressor is disconnected from the crankshaft 113 in step 1031 as in step 1016.

After completing any one of steps 1023, 1027, 1028, 1030 and 1031, other control procedures are executed in step 1032, and then the program returns to point y in FIG. 2-1 and to step 1001. The other control procedures include a procedure to determine a fuel injection rate on the basis of the intake pressure, the engine speed and the temperature of the cooling water, and to inject fuel at the fuel injection rate in synchronism with the operation of the engine 100 at predetermined crank angles, and a procedure to determine ignition crank angles for the spark plugs 111 on the basis of the engine speed, the temperature of the cooling water and other associated factors, and to form sparks for ignition by the spark plugs 111 respectively at the ignition crank angles.

The control operation according to the control program shown in FIG. 2-1 and FIG. 2-2 increases the displacement of the compressor 201 to the maximum in a state where the air conditioner 200 is operated and the engine 100 is idling, and the idling speed is regulated according to the required cooling ability.

Figure 5:
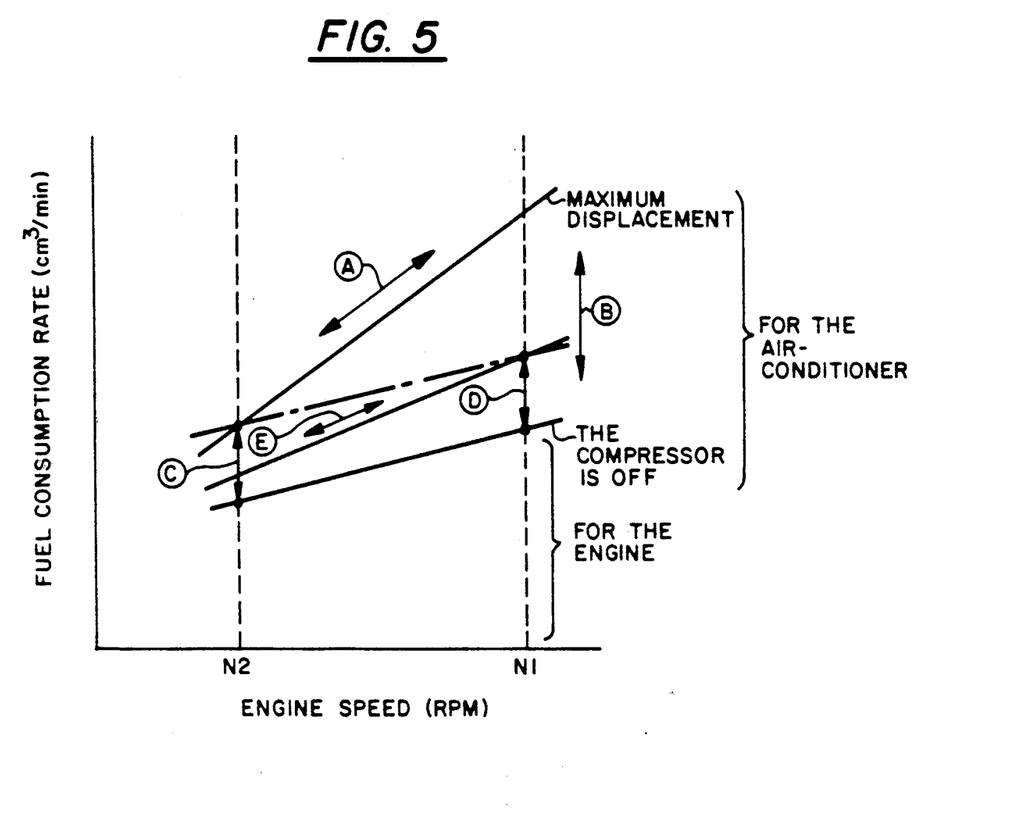
FIG. 5 is a graph of assistance in comparing the rate of fuel consumption of the engine of an automobile equipped with an automotive air conditioner controlled by a conventional automotive air conditioner controller and that of the engine of a similar automobile equipped with an automotive air conditioner controlled by an automotive air conditioner controller of the present invention.

The advantages of this apparatus for controlling an automotive air conditioner will be described hereinafter with reference to FIG. 5. The conventional automotive air conditioner controller adjusts the engine speed to a comparatively high desired idling speed $N_1$ while the engine is idling so that the air conditioner is able to operate at the full capacity, and regulates the displacement of the compressor according to the required cooling ability as in the manner for regulating the cooling ability of the air conditioner while the engine is in the normal operation to drive the automobile for running. The automotive air conditioner of the present invention adjusts the displacement of the compressor 201 to the maximum as indicated by arrows A when the air conditioner 200 is in operation while the engine is idling, and regulates the engine speed so as to coincide with a desired idling speed. This idling speed is varied according to required cooling ability. Accordingly, when the air conditioner 200 is controlled by the conventional apparatus for controlling automotive air conditioner, the total fuel consumption rate is the sum of a fuel consumption rate for the engine at an engine speed $N_1$ and a fuel consumption rate D. In that case when the engine speed is decreased simply the cooling ability is decreased which is variable as indicated by arrows B, for the air conditioner 200. However, when the air conditioner 200 is controlled by the apparatus for controlling automotive air conditioner of the present invention, the displacement of the compressor 201 is adjusted to the maximum and the idling speed is adjusted to an engine speed $N_2$, which is lower than the idling speed $N_1$, where the air conditioner 200 operates at a required cooling ability. Since the fuel consumption rate for the air conditioner 200 is the same as indicated by arrows C the total fuel consumption rate is reduced by a value represented by the difference between the idling speeds $N_1$ and $N_1$. Thus, the air conditioner 200 is controlled for operation for the same cooling ability at a lower idling speed, so that the fuel consumption rate is reduced.

Although only a few embodiments have been described in detail above, those having ordinary skill in the art will certainly understand that many modifications are possible in the preferred embodiment without departing from the teachings thereof. For instance, the automotive air conditioner controller in this embodiment adjusts the displacement of the compressor to the maximum when the air conditioner is in operation while the engine is idling, the displacement of the compressor may be adjusted to a value near the maximum, for example, 80% or 90% of the maximum.

All such modifications are intended to be encompassed within the following claims.

What is claimed is:

1. An apparatus for controlling an automotive air conditioner comprising:
   (a) an air conditioner having a variable displacement compressor driven by an automotive internal combustion engine for keeping an automotive passenger compartment at a proper temperature;
   (b) first detecting means for detecting an idling state of said automotive internal combustion engine;
   (c) second detecting means for detecting an air conditioning operation state of said air conditioner, when said automotive air conditioner is operating;
   (d) first displacement means for adjusting and maintaining a displacement of said variable displacement compressor to or near to a maximum displacement thereof responsive to first detecting means detecting the idling state and said second detecting means detecting that said automotive air conditioner is operating;
   (e) determining means for determining whether a cooling ability of said air conditioner must be increased;
   (f) idling speed setting means for setting a desired idling speed of said automotive internal combustion engine to a lower speed than a current idling speed when said determining means determines that cooling ability does not need to increase; and
   (g) engine speed control means for controlling an actual idling speed of said automotive internal combustion engine to substantially said desired idling speed.

2. An apparatus for controlling an automotive air conditioner according to claim 1, further comprising:
   second displacement means responsive to said first detecting means, for adjusting the displacement of said variable displacement compressor when said automotive internal combustion engine is in an operating state other than the idling state.

3. An apparatus for controlling an automotive air conditioner according to claim 1, further comprising cooling ability increasing means, responsive to said determining means, for:
   (a) determining if the displacement of said compressor is maximum;
   (b) increasing said displacement if it is not maximum, and
   (c) controlling the desired idling speed if it is maximum.

4. An apparatus for controlling an automotive air conditioner according to claim 1, further comprising:
   electric charge detecting means for detecting an electric charge of a storage battery when said air conditioner is operating in the idling state and the cooling ability of said air conditioner is not required to be increased responsive to said determining means and controlling said compressor in a way to lessen a load on the engine when said electric charge is insufficient.

5. An apparatus for controlling an automotive air conditioner according to claim 4, wherein said electric charge detecting means includes means for disconnecting said compressor from said engine when said electric charge is insufficient and a displacement of said compressor is minimum.

6. An apparatus for controlling an automotive air conditioner according to claim 4, wherein said electric charge detecting means includes means for adjusting the displacement of said variable displacement compressor when said electric charge is insufficient and said compressor is not minimum.

7. An apparatus for controlling an automotive air conditioner according to claim 1, further comprising displacement adjusting means for adjusting the displacement of said variable displacement compressor when the desired idling speed set by said desired idling speed setting means is at a predetermined lowest idling speed.

8. An apparatus for controlling an automotive air conditioner according to claim 1, wherein the idling speed setting means includes electric charge detecting means for detecting an electric charge of the battery, and lowest speed detecting means for detecting if said desired idling speed is equal to a lowest idling speed, and for setting said desired idling speed to a lower speed only when battery charge is sufficient and said idling speed is not said lowest speed.

9. An apparatus for controlling an automotive air conditioner according to claim 1 wherein, said engine speed control means includes a crank angle detector for detecting a crank angle of a crankshaft of said automotive internal combustion engine, and calculates a mean engine speed at predetermined periods based on a signal of said crank angle detector.

10. An apparatus for controlling an automotive air conditioner according to claim 9 wherein, said engine speed control means includes means for controlling the idling speed based on a result of comparing the mean engine speed with the desired idling speed.

11. An apparatus for controlling an automotive air conditioner according to claim 1 further comprising clutch operating means for determining if compressor displacement is minimum and minimizing said compressor displacement if not, and for connecting said compressor to the engine only when said displacement is minimum.

12. A method of controlling an automotive air conditioner comprising the steps of:
   (a) detecting an idling state of said automotive internal combustion engine;
   (b) detecting whether an air conditioner is operating;

(c) adjusting and maintaining a displacement of said variable displacement compressor to or near to a maximum displacement responsive to said idling state being detected;

(d) detecting whether a cooling ability of said air conditioner is commanded to be increased;

(e) raising and lowering a desired idling speed to form a new desired idling speed of said automotive internal combustion engine responsive to a result of said step (d) indicating that increased cooling ability is commanded and not commanded, respectively, and said idling state is detected; and (f) controlling an actual idling speed of said automotive internal combustion engine to substantially said new desired idling speed thereby keeping a temperature of an automobile compartment at a desired temperature.

* * * * *